Nov. 8, 1949     B. H. KELLOGG     2,487,655
FLUID FLOW CONTROL

Filed Nov. 28, 1945     2 Sheets-Sheet 1

INVENTOR.
BRUCE H. KELLOGG.
BY
ATTORNEY

Nov. 8, 1949   B. H. KELLOGG   2,487,655
FLUID FLOW CONTROL
Filed Nov. 28, 1945   2 Sheets-Sheet 2
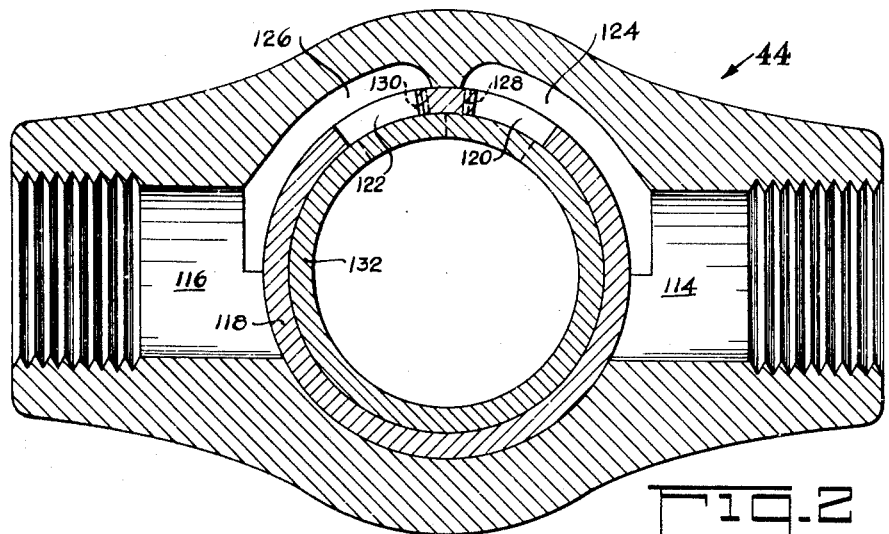
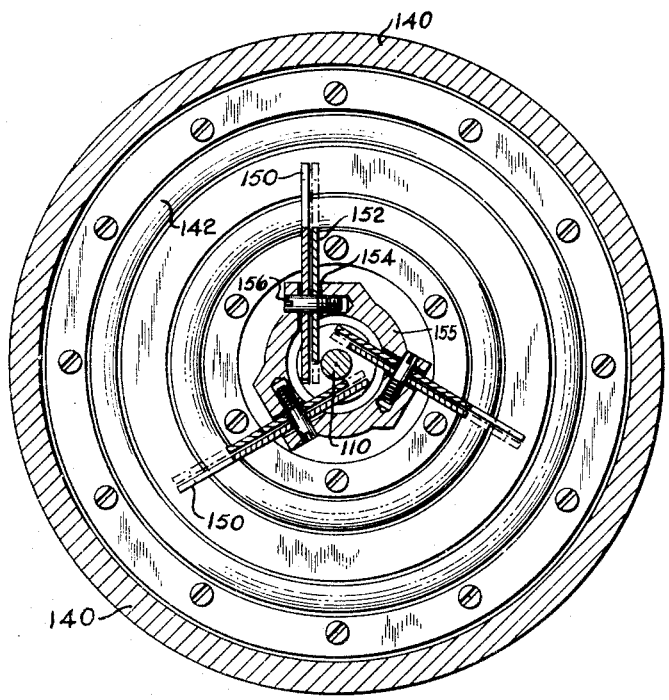
INVENTOR.
BRUCE H. KELLOGG.
BY
ATTORNEY Patented Nov. 8, 1949

2,487,655

UNITED STATES PATENT OFFICE 2,487,655

FLUID FLOW CONTROL

Bruce H. Kellogg, Los Angeles, Calif., assignor to Wright Aeronautical Corporation, a corporation of New York Application November 28, 1945, Serial No. 631,299

15 Claims. (Cl. 103—11)

This invention relates to fluid flow dividing means and is particularly directed to a fuel injection system for a multi-cylinder internal combustion engine comprising two fuel injection pump units, each serving one group of engine cylinders.

Internal combustion engines having a large number of cylinders into which fuel is directly injected have been provided with two fuel injection pump units, the one unit distributing fuel under pressure to one group of engine cylinders and the other unit distributing fuel under pressure to a second group of engine cylinders. In the prior art, in order to insure an equal supply of fuel to both groups of engine cylinders, the capacity adjustment of the two pump units are interconnected by mechanical linkage. This interconnected linkage expands and contracts with changes in engine temperature, thereby disturbing the relative capacity adjustment of the two pumps. Also, the two pump units are generally disposed a substantial distance from each other so that the entire linkage becomes quite long and is subject to engine vibration.

It is an object of this invention to provide a new and improved means for equalizing the capacity of two parallel connected fuel injection pump units. Specifically, the invention comprises means for providing a pressure difference proportional to the difference in the rates of fuel delivery of the two pump units and then utilizing this pressure differential to adjust the pumping rate of one of said units.

Other objects of this invention will become apparent upon reading the annexed detailed description in connection with the drawing in which:

Figure 2 is an enlarged sectional view taken along line 2—2 of Figure 1; and

Figure 3 is an enlarged sectional view taken along line 3—3 of Figure 1.

Figure 1:
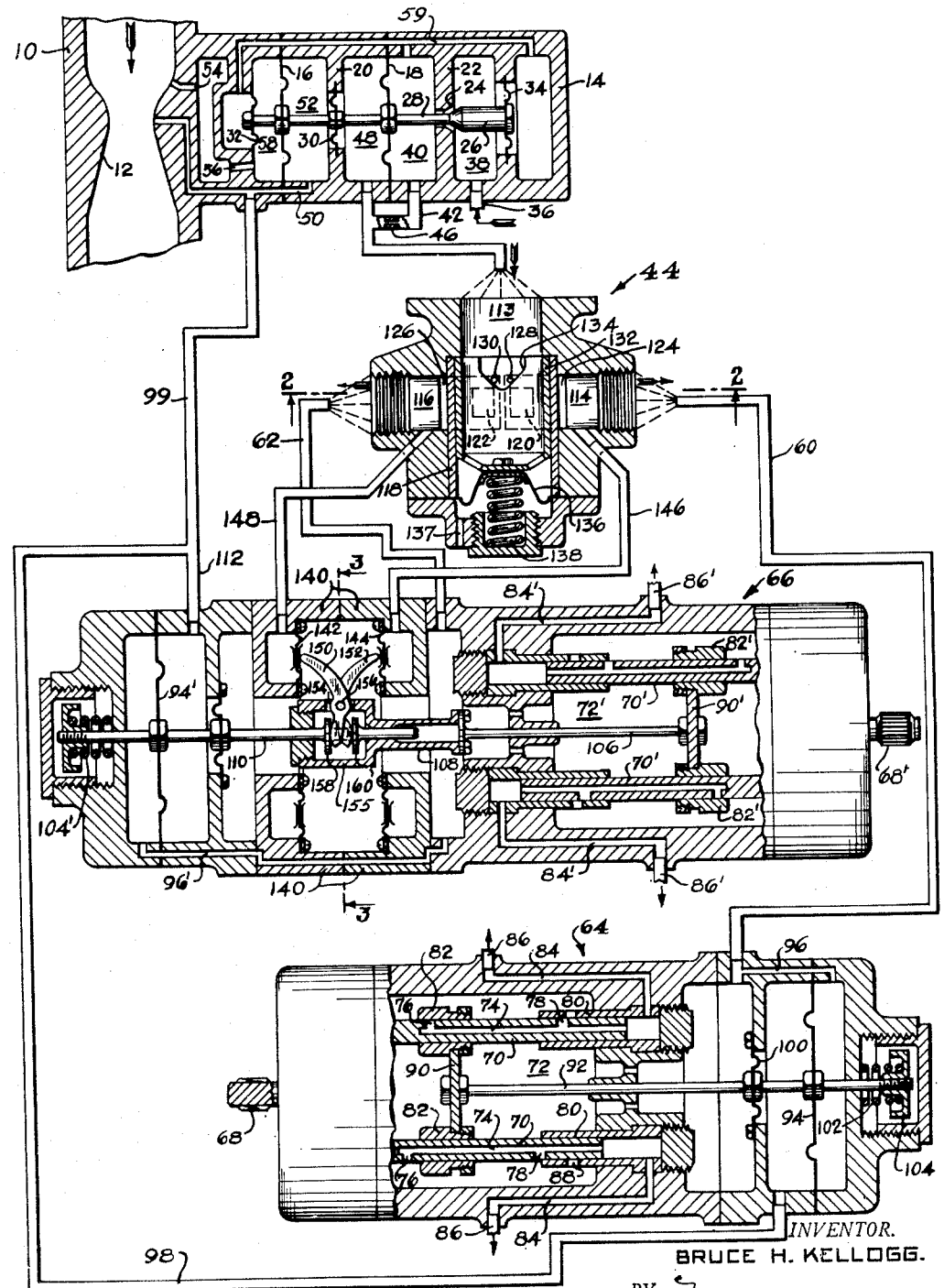
Figure 1 is a schematic view of a fuel injection system embodying the invention.

Referring to the drawing, reference numeral 10 designates an air intake duct for a multi-cylinder internal combustion engine and having a venturi 12 disposed therein for measuring the combustion air flow to the engine. In order to proportion the engine fuel flow to the air flow, a housing 14 has a pair of flexible diaphragms 16 and 18 extending thereacross and a fixed partition 20 also extends across the housing between the flexible diaphragms. A second fixed partition 22 extends across the housing and is provided with a fuel valve port 24. A fuel valve 26 is provided with a valve stem 28 passing through the port 24 and connecting the diaphragms 16 and 18 for simultaneous movement. A small diaphragm 30 provides a seal between the fixed partition 20 and the valve stem 28. Also, small diaphragms 32 and 34 are connected between their associated ends of the valve stem and the housing 14.

Fuel under pressure is supplied through a conduit 36 to a chamber 38 within the housing 14 on the valve head side of the partition 22. The valve 26 controls the flow of fuel through the valve port 24 to a chamber 40 on the adjacent side of the diaphragm 18. From the chamber 40, the fuel flows through a conduit 42 to a flow dividing valve 44 hereinafter described. A restriction 46 in the conduit 42 provides a fuel pressure differential thereacross proportional to the fuel flow and the downstream side of this restriction is connected to a chamber 48 between the partition 20 and the flexible diaphragm 18. With this construction, the diaphragm 18 is subjected to a pressure differential proportional to the fuel flow. The Venturi throat pressure is connected by a passage 50 to a chamber 52 between the flexible diaphragm 16 and the partition 20 and the Venturi impact pressure is connected through passages 54 and 56 to a chamber 58 on the other side of the flexible diaphragm 16. In addition, the ends of the valve stem are subjected to the same pressure via a passage 59—for example, the fuel pressure in the chamber 40.

With this construction, the fuel valve 26 is urged in an opening direction by the air pressure differential across the diaphragm 16 and in the opposite direction by the fuel pressure differential across the diaphragm 18. Accordingly, the fuel valve 26 is automatically adjusted to maintain a fuel flow proportional to the air flow. As is conventional practice, the ratio of fuel to air may be regulated by adjustment of the restriction 46. The structure so far described is conventional and any means providing a fuel flow in conduit 42 proportional to the air flow may be substituted therefor.

From the fuel conduit 42, the fuel passes through the flow dividing valve 44, hereinafter described, to conduits 60 and 62. The conduit 60 is connected to a fuel injection pump unit 64 serving one group of engine cylinders, while the conduit 62 is connected to a fuel injection pump unit 66 serving the remainder of engine cylinders. The injection pump unit 64 is conventional and per se forms no part of the present invention. This unit 64 comprises a shaft 68 adapted to be driven by the engine. Shaft 68 is operatively connected to a plurality of circumferentially spaced plungers 70 by suitable means—as for example, a wobble plate (not shown)—such that rotation of the shaft 68 effects sequential reciprocation of the plungers 70.

Fuel is supplied into the interior of the pump unit 64 from the conduit 60 and into a chamber 72 within which the plungers 70 are disposed. Each plunger 70 is adapted to pump fuel from the chamber 72 to an individual engine cylinder. To this end, each plunger 70 has a longitudinal passage 74 and a pair of radial passages 76 and 78 opening into the passage 74. Also, each plunger is slidable within a pair of spaced sleeves 80 and 82 and the inner end of each sleeve 80 is in communication with an individual engine cylinder through a passage 84 and conduit 86.

When a plunger 70 is withdrawn from the sleeve 80 to the end of its stroke—as illustrated by the bottom plunger 70 of the unit 64—fuel from the chamber 72 fills the plunger passages 74, 76 and 78 and the inner end of the sleeve 80. As this plunger moves to the right (Figure 1) the radial passage 78 is first closed by the sleeve 80 but this has no operative effect since the radial passage 76 is still open. Upon further movement of the plunger 70, the radial passage 76 is closed by the sleeve 82, whereupon the plunger passages are all closed and further movement of the plunger to the right pumps fuel out from the end of the sleeve 80 to its associated engine cylinder. This pumping action continues until the radial passage 78 communicates with an opening 88 in the sleeve 80. In this way, the start of the pumping stroke of each plunger is determined by the position of its sleeve 82 and the end of this pumping stroke by the opening 88 in the sleeve 80. Accordingly, the quantity of fuel delivered by each plunger per stroke may be adjusted by varying the axial position of its sleeve 82. Thus, in Figure 1, upon leftward adjustment of the sleeves 82, the pumping action of each plunger starts closer to the beginning of its stroke with the result that more fuel is pumped during each stroke. Similarly, rightward adjustment of the sleeves 82 delays the start of the pumping action of each plunger relative to the starting of its stroke, thereby decreasing the quantity of fuel pumped during each stroke.

The sleeves 82 are adapted for simultaneous adjustment by a plate 90 secured to a rod 92 which, in turn, is connected to a flexible diaphragm 94. One side of the flexible diaphragm 94 is connected by a passage 96 to the fuel supplied to the pump unit 64, while the other side of the diaphragm 94 is connected to a suitable low pressure—for example, the Venturi suction pressure—by conduits 98 and 99. A small seal diaphragm 100 separates low pressure side of a diaphragm 94 from the interior of the pump unit 64. Also, a spring 102 acts against an adjustable nut 104 on the rod 92 to urge the rod to the right against the pressure differential on a diaphragm 94.

With this construction, if the fuel valve 26 opens further, the pressure of the fuel supplied to the unit 64 increases whereupon the increased fuel pressure against the diaphragm 94 effects movement of the sleeves 82 to the left thereby increasing the quantity of fuel pumped per stroke of each plunger. Similarly, if a closing adjustment of the fuel valve 26 is effected, the pressure of the fuel supplied to the unit 64 will decrease and the diaphragm 94 will move the sleeves 82 to the right to decrease the quantity of fuel pumped per stroke of each plunger.

The pump unit 66 is generally similar to the pump unit 64 but is mounted on the opposite side of the engine and parts of the pump unit 66, similar to parts of the pump unit 64, have been designated by similar, but primed, reference numerals. Fuel is delivered to the pump unit 66 from the dividing valve 44 through the conduit 62 and the fuel fills the pump chamber 72' within which the plungers 70' are disposed. The engine drives the shaft 68' to reciprocate the plungers 70' whereby each plunger pumps fuel out through its associated passage 84' and conduit 86' to its engine cylinder. The quantity of fuel delivered per stroke of each plunger 70' can be increased by moving the sleeves 82' to the right and vice versa. The sleeves 82' are connected together to a plate 90' secured to a rod 106 having a tubular extension 108 at its outer end. A second rod 110, connected to the diaphragm 94', is adjustably connected to the rod 106 and its extension 108 by means hereinafter described for adjustment of the sleeves 82' relative to the diaphragm 94'.

The one side of the diaphragm 94' is subjected to the fuel pressure within the pump unit 66 through the passage 96' while its other side is connected to the Venturi suction pressure by conduits 112 and 99. A spring 104' opposes the pressure differential acting on diaphragm 94'. Accordingly, any increase in the fuel pressure at the pump unit 66 acts on the diaphragm 94' which, through the rods 106 and 110 and plate 90', moves the sleeves 82' to the right to increase the quantity of fuel delivered per stroke of the plunger 70'. Similarly, any decrease in the fuel pressure at the pump unit 66 results in movement of the sleeves 82' to the left to decrease the quantity of fuel delivered per stroke of the plunger 70'.

Assuming for the moment that the valve 44 is only a T-connection dividing the fuel flow from the conduit 42 to the conduits 60 and 62 and neglecting any difference in the fuel pressure drop through the fuel conduits 60 and 62, then if the fuel pump injection units 64 and 66 are identical in all respects, the plungers of each unit will deliver the same quantity of fuel per stroke. However, in actual practice it is necessary to interconnect the sleeves 82 and 82' to insure equal rates of fuel delivery by each pump unit. In the past, the sleeves 82 and 82' were mechanically linked together and the linkage was adjustable to effect said equal fuel delivery. However, such mechanical linkage was quite long and cumbersome, particularly when the units 64 and 66 were disposed on opposite sides of the engine. Also, with the prior art construction, expansion and contraction of this linkage with changes in engine temperature disturbed the relative adjustment of the two pump units.

With the present invention, the prior art mechanical connection between the pump units 64 and 66 has been eliminated and instead the pump unit 66 has been modified by adding means responsive to differences in the rates of fuel delivery of the pump units 64 and 66 to adjust the effective length of the connection between the diaphragm 94' and the sleeves 82'. In this way, the sleeves 82' of the pump unit 66 are adjusted until both pump units are again delivering fuel at the same rate. To this end, the flow dividing valve 44 has been added between conduit 42 and conduits 60 and 62 to provide a fuel pressure differential proportional to differences in the fuel flow through conduits 60 and 62.

The flow dividing valve 44 comprises an inlet port 113 and a pair of outlet ports 114 and 116 disposed on diametrically opposed sides of said inlet port, the outlet ports 114 and 116 being connected to conduits 60 and 62 respectively. A fixed sleeve 118 disposed within said inlet port 113 is provided with a pair of adjacent similar openings 120 and 122. The opening 120 communicates with the outlet port 114 through the passage 124 while the opening 122 communicates with the outlet port 116 through the passage 126. In addition, the fixed sleeve 118 is provided with a pair of relatively small openings 128 and 130 also communicating with the passages 124 and 126 respectively. A second sleeve 132 is slidably fitted within the fixed sleeve 118. This second sleeve 132 is provided with an approximately V-shaped slot 134 at its inlet end which slot is arranged to straddle the two small openings 128 and 130 and the two larger openings 120 and 122. The lower end of the sleeve 132, as viewed in Figure 1, is closed by and is connected to a flexible diaphragm 136 and a spring 138 urges the sleeve to the extreme valve closing position illustrated in the drawing. The spring side of the diaphragm 136 is in communication with a vent passage 137 which may be connected to a suitable pressure—e. g., the throat of the venturi 12.

The arrangement of the valve 44 is such that with the sleeve 132 at its extreme position, as positioned by the spring 138, the V-shaped slot 134 uncovers both small openings 128 and 130, but the large openings 120 and 122 are both closed by this sleeve. Accordingly, with the sleeve 132 in this extreme position, fuel entering the inlet port 113 divides through the small equal openings 128 and 130 and flows through the passages 124 and 126 to the outlet ports 114 and 116. The small openings 128 and 130 are designed to supply sufficient fuel for engine idling operation. Upon any increase in air flow, the fuel valve 26 opens to a proportionately greater extent, thereby increasing the fuel pressure at the inlet port 113. This increase in fuel pressure acting against the diaphragm 136 lowers the inner sleeve 132, as viewed in Figure 1, whereupon the V-shaped slot 134 starts to uncover the openings 120 and 122 in the outer sleeve 118 to an equal extent. In this way, as the fuel valve 26 opens in response to an increase in the air flow, the sleeve 132 moves against the spring 138 to increase the valve opening between the inlet port 113 and the outlet ports 114 and 116. The design is such that in each position of the sleeve 132, the valve openings 120 and 122 are uncovered to the same extent. As used in this specification and claims, the "resistance" of one fluid flow path to fluid flow therethrough is considered to be the same as the resistance of another fluid flow path when the fluid pressure drop along both fluid flow paths are the same for equal rates of fluid flow of the same fluid along each said path.

With this construction of the valve 44, when the fuel flow through conduit 60 is equal to the fuel flow through the 62, the fuel pressure will be the same in these conduits, but when there is a difference in the fuel flow through these conduits, their fuel pressures will be different. This difference in pressure will be measurable at small fuel flows as well as at large fuel flows because of the decrease in size of the port area of the valve 44 with decrease in fuel flows. Preferably, the valve 44 is installed with the opening 120 and 122 disposed toward the top of the valve housing and with the pressure lines 146 and 148 entering the valve ports 114 and 116 vertically from the bottom of the valve housing. Also, with the above valve construction, minor manufacturing variations can be compensated by relative rotative adjustment of the sleeves 118 and 132 so that the sleeve 132 uncovers the openings 120 and 122 to the same extent.

The fuel injection pump unit 66 is provided with a two-part additional section 140 not provided in the pump unit 64. This section 140 has means for adjusting the effective length of the connection between the diaphragm 94' and the sleeves 82' in response to differences in rates of fuel flow in conduits 60 and 62. The section 140 comprises a pair of annular flexible diaphragms 142 and 144, the remote sides of which are subjected to the fuel pressure in conduits 60 and 62 through pressure lines 146 and 148 respectively. The diaphragms 142 and 144 are connected together for joint movement through one or more pairs of levers 150 and 152—three such pairs of levers are illustrated in the drawing of Figure 3. Each pair of levers extends through a slot 154 in an enlarged portion 155 of the tubular extension 108 and is pivoted about a pin 156 carried by said portion and extending across said slot. The outer ends of each pair of levers 150 and 152 are disposed in engagement with the diaphragms 142 and 144 respectively and their inner ends are respectively disposed in engagement with spaced annular flanges 158 and 160 formed on a rod 110. With this construction, the fluid pressure acting against the diaphragms 142 and 144 constantly urges the outer ends of the levers 150 and 152 toward each other and urges their inner ends away from each other into engagement with the flanges 158 and 160. Accordingly, the fluid pressure acting on the diaphragms 142 and 144 is always effective to take up any play in the connection between the rod 110 and the tubular extension 108 thereby automatically compensating for any wear in this connection.

When the fluid pressures acting on the diaphragms 142 and 144 are equal, any movement of the rod 110 is transmitted through the levers 150 and 152 to the pivot pins 156 which shifts the tubular extension 108 and the rod 106 to adjust the sleeves 82'. Accordingly, the operation of the fuel pump injection unit 66 is similar to the operation of the unit 64. However, a given movement of the control diaphragm 94 of the pump unit 64 effects a larger adjustment of its sleeves 82 as compared to adjustment of the sleeves 82' of the pump unit 66 effected by the same movement of its control diaphragm 94'. This is so because the levers 150 and 152 reduce the movement of the rod 106 and sleeves 82' relative to the rod 110 and diaphragm 94'. Therefore, the springs 104 and 104' are provided with different spring rates so that the sleeves 82 and 82' are adjusted to the same extent in response to equal changes in fuel pressure at the diaphragms 94 and 94'.

If the pump unit 64 should deliver fuel at a faster rate than the pump unit 66, then the pump fuel pressure in conduit 62 will be greater than the fuel pressure in conduit 60 and the resulting fuel pressure differential on the diaphragms 142 and 144 will shift these diaphragms together with the outer ends of the levers 150 and 152 to the right (Figure 1). The levers 150 and 152 will then pivot about their inner ends to shift the tubular extension 108 in rod 106 to the right relative to the rod 110 and the diaphragm 94' thereby adjusting the sleeves 82' to the right to increase the rate of fuel delivery by the pump unit 66. This correcting adjustment continues until the two pump units again deliver fuel at the same rate. A similar but opposite adjustment takes place if the pump unit 64 delivers fuel at a slower rate than the pump unit 66.

It may be desirable to have one pump unit supply more fuel per stroke—e. g. because of the greater volumetric efficiency of the cylinders served by this unit. Or the one pump unit may be designed to serve a larger number of cylinders, in which case this pump unit would supply fuel at a faster rate than the other. In either of these cases, if the pump unit 64 is required to supply more fuel than the unit 66, the valve 44 is designed so that the valve opening between ports 113 and 114 is greater than that between ports 113 and 116 by an amount required to maintain this unequal division of fuel flow.

The levers 150 and 152 preferably are designed so that their leverage remains constant regardless of the axial position of the diaphragms 142 and 144 and the rod 110. That is, the levers are designed so that the same line of contact on the flanges 158 and 160 always remains in contact with the inner ends of the levers and the same line of contact on the diaphragms 142 and 144 always remains in contact with the outer ends of the levers. To this end, the engaging ends of the levers are formed with involute profiles. The involute profiles of the inner ends of the levers 150 and 152 are generated from a base cylinder co-axial with its associated pivot pin 156 and tangent to the path of movement of the desired contact line on the flanges 158 and 160. Similarly, the involute profiles of the outer ends of the levers 150 and 152 are generated from a base cylinder co-axial with its associated pivot pin 156 and tangent to the path of movement of a desired contact line on the diaphragms 142 and 144.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A fluid flow-dividing system comprising first, second and third fluid flow passages, means providing flow paths of substantially equal resistance from said first passage to said second and third passages, means for effecting equal decreases in the resistance of said flow paths in response to increases in the total fluid flow and vice versa, means responsive to changes in the proportion of the fluid pressures in said second and third passages, and means controlled by said responsive means for adjusting the fluid flow in said second passage to maintain a substantially constant division of flow between said second and third passages.

2. A fluid flow-dividing system comprising a first passage through which a fluid is supplied to second and third passages, valve means providing a first port area between said first and second passages and an equal second port area between said first and third passages, means for automatically adjusting said valve means for effecting an equal increase in the areas of said two ports upon an increase in the fluid flow and vice versa, means responsive to changes in the proportion of the fluid pressures in said second and third passages, and means controlled by said responsive means for adjusting the fluid flow in said second passage to maintain a substantially constant division of flow between said second and third passages.

3. In a multi-cylinder internal combustion engine having a pair of spaced pump units driven from said engine for feeding fuel to their respective groups of engine cylinders, means responsive to changes in the relative proportion of the fuel delivery rates of said two pump units, and means controlled by said responsive means for adjusting the rate of fuel delivery of one of said pump units relative to the other.

4. A fluid flow-proportioning system comprising a pair of pumps, means responsive to changes in the proportion of the rates of the fluid delivery of said two pumps, and means controlled by said responsive means for adjusting the rate of fuel delivery of at least one of said pumps for maintaining a substantially constant proportion between the fluid delivery rates of said two pumps.

5. A fluid flow-dividing system comprising a first passage through which a fluid is supplied to second and third passages, a pump for said second passage, a pump for said third passage, means for establishing a first fluid pressure proportional to the flow through said second passage and establishing a second fluid pressure proportional to the flow through said third passage, and means responsive to changes in the relative proportion of said fluid pressures for adjusting the rate of fluid delivery of one of said pumps.

6. A fluid flow-dividing system comprising a first passage through which a fluid is supplied to second and third passages, a pump for said second passage, a pump for said third passage, means responsive to changes in the proportion of the fluid pressures in said second and third passages, and means controlled by said responsive means for adjusting the rate of fluid delivery of one of said pumps relative to the other.

7. A fluid flow-dividing system comprising a first passage through which a fluid is supplied to second and third passages via restricted paths of substantially equal resistance, a pump for said second passage, a pump for said third passage, means responsive to changes in the proportion of the fluid pressures in said second and third passages, and means controlled by said responsive means for adjusting the rate of fluid delivery of one of said pumps relative to the other.

8. A fluid flow-dividing system comprising a first passage through which a fluid is supplied to second and third passages via restricted paths of substantially equal resistance, a pump for said second passage, a pump for said third passage, a pair of means each operatively connected to one of said pumps and operable to adjust the rate of fluid delivery of its associated pump in response to changes in the fluid inlet pressure to its pump, and means responsive to changes in the proportion of the pressures in said second and third passages for varying the rate of fluid delivery of one of said pumps.

9. A fluid flow-dividing system comprising a first passage through which a fluid is supplied to second and third passages via restricted paths of substantially equal resistance, a pump for said second passage, a pump for said third passage, a pair of means each operatively connected to one of said pumps and operable to adjust the rate of fluid delivery of its associated pump in response to changes in the fluid inlet pressure to its pump, and means responsive to changes in the proportion of the pressures in said second and third passages for adjusting the connection between one of said pair of means and its pump for varying the rate of fluid delivery of said pump.

10. A fluid flow-dividing system comprising a first passage through which a fluid is supplied to second and third passages, valve means providing a first port area between said first and second passages and an equal second port area between said first and third passages, means for automatically adjusting said valve means for effecting an equal increase in each of said port areas with increase of fluid flow and vice versa, a pump for said second passage, a pump for said third passage, means responsive to changes in the proportion of the rates of fuel flow through said second and third passages, and means controlled by said responsive means for adjusting the rate of fluid delivery of one of said pumps relative to the other.

11. A fluid flow-proportioning system comprising a pair of pumps, one of said pumps having a pair of members relatively movable to adjust the rate of fluid delivery of said one pump, a lever operatively interconnecting said members and movable to effect relative movement of said members, and means responsive to changes in the proportion of the fluid delivery rates of said pumps for moving said lever.

12. A fluid flow-proportioning system comprising a pair of pumps, one of said pumps having a pair of members relatively movable to adjust the rate of fluid delivery of said one pump, a pair of levers pivotally connected to one of said members and respectively engaging oppositely facing surfaces on the other of said members, and means engageable with said levers to urge said levers against their respective surfaces, said last mentioned means being responsive to changes in the proportion of the fluid delivery rates of said pumps for moving said levers to effect relative movement of said members thereby adjusting the rate of fluid delivery of said one pump.

13. A fluid flow-dividing system comprising a first passage through which a fluid is supplied to second and third passages, a pump for said third passage, and means for adjusting the rate of discharge of one of said pumps relative to the other, said means comprising a pair of members axially movable relative to each other to effect said adjustment, a pair of flexible diaphragms urged toward each other by pressures respectively proportional to the rates of fluid flow through said second and third passages, and a pair of levers pivotally connected to one of said movable members, the other of said members having a pair of oppositely facing surfaces, each of said levers engaging one of said surfaces and one of said pair of diaphragms, the arrangement being such that changes in the proportion of the pressures acting on said diaphragms is effective through said levers to effect relative movement of said adjustable members to vary the rate of fluid discharge of their associated pump.

14. A fluid flow-dividing system comprising a first passage through which a fluid is supplied to second and third passages, a pump for said second passage, a pump for said third passage, each of said pumps having a member movable to adjust the rate of discharge of its associated pump, a flexible diaphragm for each pump subjected to the fuel pressure supplied to its associated pump and operatively connected to the adjusting member of said pump for increasing the rate of discharge of said pump with increase of fuel pressure and vice versa, the connection between the diaphragm of one of said pumps and its adjusting member comprising a pair of relatively axially adjustable members, a pair of flexible diaphragms each subjected to the fuel pressure in one of said second and third passages for urging said diaphragms toward each other, and a pair of levers pivotally connected to one of said axially adjustable members, the other of said axially adjustable members having a pair of oppositely facing surfaces, each of said levers engaging one of said surfaces and one of said pair of diaphragms, the arrangement being such that changes in the proportion of the fluid pressures acting on said diaphragms is effective through said levers to effect relative movement of said adjustable members to vary the rate of discharge of their associated pump.

15. In a fluid flow-dividing system comprising a first passage through which a fluid is supplied to second and third passages, valve means providing a first port area between said first and second passages and a second port between said first and third passages, means for automatically adjusting said valve means for effecting a proportionate increase in the areas of said two ports upon an increase in the fluid flow and vice versa, means responsive to changes in the proportion of the fluid pressures in said second and third passages for effecting relative adjustment of the fluid flow through said passages to maintain a substantially constant division of flow therebetween.

BRUCE H. KELLOGG.

REFERENCES CITED

The following references are of record in the file of this patent:

UNITED STATES PATENTS

| Number | Name | Date |
| --- | --- | --- |
| 2,283,266 | Kinsella | May 19, 1942 |
| 2,296,669 | Herman et al. | Sept. 22, 1942 |